Patented Feb. 12, 1924.

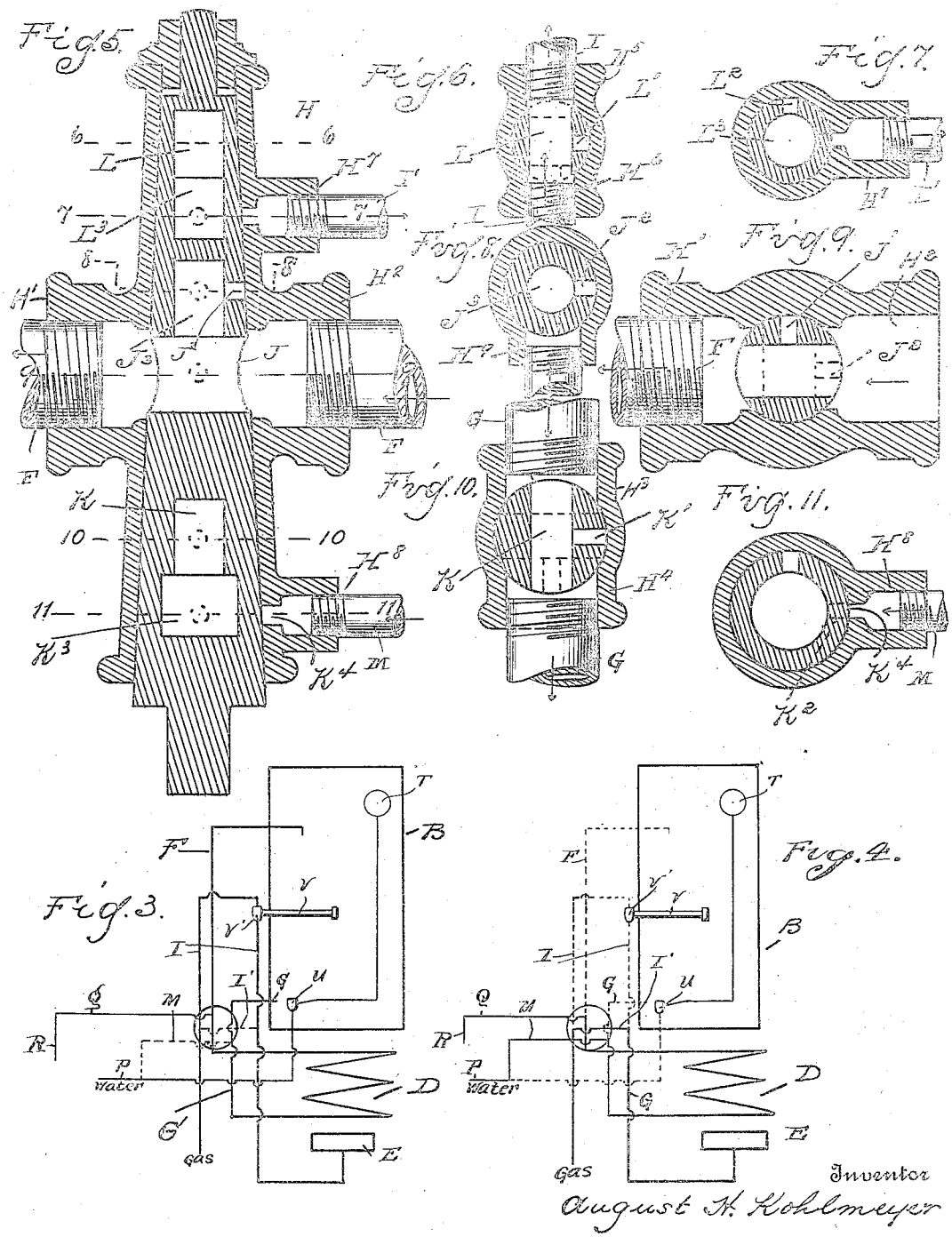

1,483,227

UNITED STATES PATENT OFFICE.

AUGUST H. KOEHLMEYER, OF DETROIT, MICHIGAN.

COMBINED WATER HEATER AND STEAM GENERATOR.

Application filed September 7, 1917, Serial No. 190,256. Renewed June 25, 1923.

*To all whom it may concern:*

Be it known that I, AUGUST H. KOHLMEYER, a citizen of the United States of America, residing at Detroit, in the county of Wayne and State of Michigan, have invented certain new and useful Improvements in Combined Water Heaters and Steam Generators, of which the following is a specification, reference being had therein to the accompanying drawings.

The invention relates to water-heaters of that type in which the hot water is stored in a tank and is heated by a circulating coil. In the present state of the art certain kinds of laundry apparatus require the use of steam as well as hot water, and it is the object of the present invention to obtain a construction by which the hot water circulating coil may be converted into a steam generator. It is a further object to guard against danger of over-pressure and also to provide means for automatically controlling the generation, as hereinafter set forth.

In the drawings:

Figures 3 and 4 are diagrams which show connections for steam generation and for water heating;

Figure 5 is a longitudinal section through the controlling valve;

Figure 1:
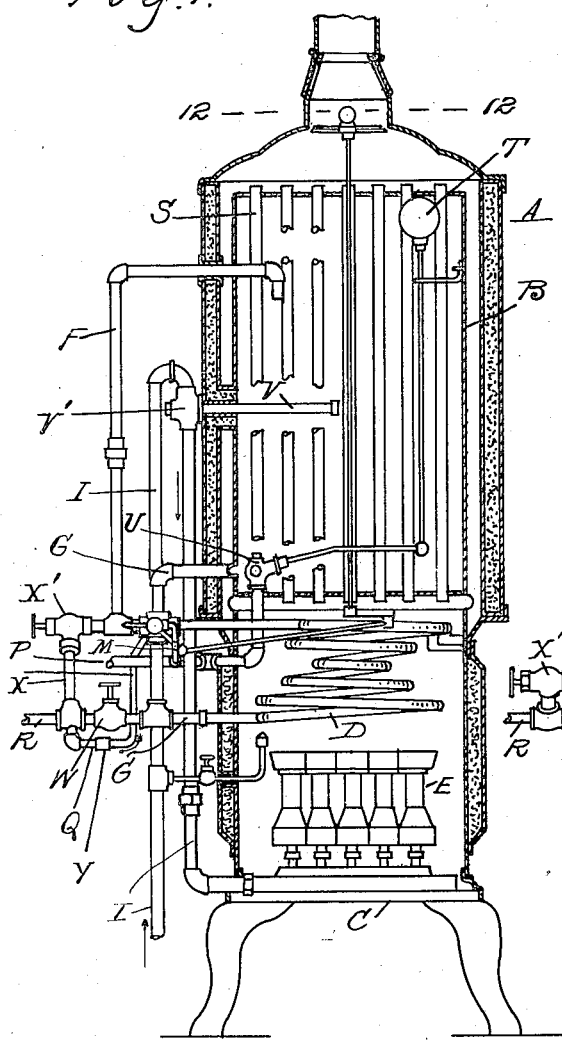
Figure 1 is a vertical section through a combined water-heater and steam-generator embodying my invention.
Figure 12:
Figure 2:
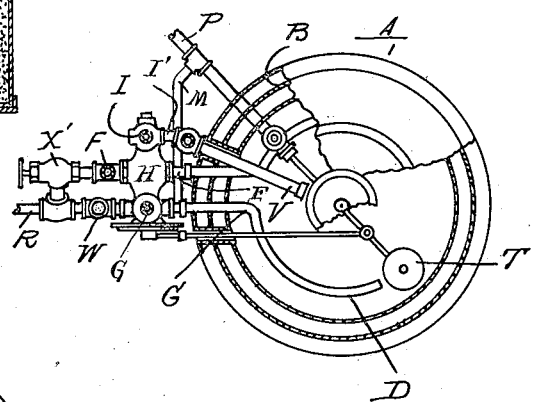
Figure 2 is a sectional plan view thereof.

Figures 6 to 11, inclusive, are cross-sections on lines 6—6, 7—7, 8—8, 9—9, 10—10 and 11—11 respectively of Figure 5;

Figure 12 is a section on line 12—12 of Figure 1.

A is a water-heater of any suitable construction, but, as shown, comprising the tank B and the base C within which is arranged the coil D and gas-burner E. The coil D is adapted for use in heating and circulating the water in the tank, and for this purpose may be connected at its upper end to the pipe F which extends to the upper portion of the tank, while its lower end is connected with the pipe G at the bottom of the tank. When, however, the coil is used for the generation of steam it is necessary to change these connections and also to limit the quantity of water which is introduced into the coil. I therefore preferably provide a controlling valve, which when adjusted to different positions will establish the particular connections desired, and as shown this valve also controls the gas supply. In detail, this valve H is provided with a casing having nipples H' and H² for connection with the pipe F and with nipples H³ and H⁴ for connection with the pipe G. The casing is also provided with nipples H⁵ and H⁶ for connection with a gas-pipe I, a nipple H⁷ for a by-pass connection I' with said gas-pipe and with a nipple H⁸ for forming the water supply for the generation of steam. The rotary valve within the casing is ported to cooperate with the nipples, there being a cross-port J for connecting the nipples H' and H² in one position of adjustment, the cross-port K having a similar relation to the nipples H³ and H⁴ and the cross-port L having a similar relation to the niples H⁵ and H⁶. In addition to the port K there is a restricted port K', which is registered with the nipple H⁴ in a different position of adjustment of the valve, and a restricted port K² communicating with the port K through the chamber K³, and in one position of adjustment registering with the port K⁴ communicating with the nipple H⁸. In the same manner the port J has a connected restricted port J' and a second restricted port J² communicating therewith through the chamber J³ and in one position of adjustment registering with the nipple H⁹. The port L has communicating therewith the restricted port L' and also the chamber L³ communicating with the restricted port L². The whole construction is such that in one position of adjustment of the valve, shown in full lines in Figures 5 to 11, communication is established between the nipples H' H² H³ H⁴ H⁵ H⁶, while in another position of adjustment, shown in dotted lines in the same figures, restricted communication is established between the nipple H² and nipple H⁹ and between the nipple H⁴ and nipple H⁸, and also between the nipples H⁶ and H⁷. In the first position of adjustment,—viz that shown in full lines, the coil D has an open circulating connection with the tank B, the water passing out from the coil to the top of the tank B and returning from the bottom of the tank through the pipe G. At the same time, a full head of gas is supplied to the gas-pipe I to the burner E. In the second position of adjustment the tank is cut off from the coil and a limited supply of water is admitted to the base of the coil through the nipple H⁸ and restricted ports K² and K' said nipple deriving its supply from the pipe P through a branch M. The steam generated from this water escapes from the top of the coil through the restricted ports J' and J² to the nipple H⁰, and from the latter through a by-pass connection Q to the conduit R leading to the point of consumption. As a full head of gas is not required for this steam generation and it is desired to prevent overheating, the gas supply is restricted, as has been described, by passing through the ports L' and L² to the by-pass gas connection I' leading to the burner.

When the steam generator is in operation the gases of combustion after leaving the coil still contain considerable heat. This I conserve by forming the boiler with a series of flues S extending longitudinally therethrough, so that the products of combustion after leaving the coil will pass through these flues, and the surplus heat will raise the temperature of the water.

My improvements are applicable to the ordinary type of hot water boiler where the tank is always under the pressure of the water supply line. As shown, however, the tank is under atmospheric pressure and the water is supplied thereto as required through the medium of a float-valve. Thus T is a float and U is the valve controlled thereby, said valve being included in a water supply pipe P within which a pressure is created, as for example by a connection (not shown) to the mains of a pumping plant.

I have also shown automatic means of regulating the heat of the water, comprising a thermostat V which operates a valve V' in the gas line, cutting down the supply of gas to the burner when a predetermined temperature is attained in the tank. Another specific feature illustrated is a valve-controlled by-pass W between the bottom of the coil and the pipe R, which permits of draining all of the hot water from the tank and coil when desired. Still another connection X, controlled by the valve X', connects the pipe F with the pipe R, to permit of drawing hot water from the top of the boiler.

With the construction described, normally the valve is adjusted in position which establishes the circulating system and the device operates as an ordinary hot water heater. When, however, steam is required, all that is necessary is to adjust the valve and the coil becomes a steam generator which furnishes a supply of steam through the pipe R.

If superheated steam is required for any purpose this may be obtained by placing a back-pressure valve Y in the conduit Q from the coil.

What I claim as my invention is:

1. The combination with a tank, a coil and a heater for said coil, of means for alternatively connecting said coil with said tank to form a circulating heater therefor and to operate said coil independently of said tank as a steam generator, and means for regulating the heat and quantity of water admitted to said coil according as the latter is operating as a water heater or a steam generator.

2. The combination with a tank, a coil and a fluid burner for heating said coil, of connections between said coil and tank for establishing a water circulation, alternative connections between said coil and the water supply and discharge conduits, and means for regulating the fluid to the burner and the water to said coil according as the latter is operating as a water heater or a steam generator.

3. The combination with a tank, a coil and a fluid burner for heating said coil, of means for alternatively connecting said coil with said tank to form a circulating heater therefor and to operate said coil independently of said tank as a steam generator, and means for restricting the supply of fluid combustible to said burner and water to said coil when the latter is operating as a steam generator.

4. The combination with a coil alternatively used to heat water and generate steam, of pipes for respectively drawing off steam and water from said coil, means for supplying water to said coil, and a common means for varying the supply of water to the coil and for varying its outlet connection according as the coil is used as a water heater or a steam generator.

5. The combination with a coil alternatively used to heat water and generate steam, of pipes for respectively drawing off steam and water from said coil, means for supplying water to the coil, a burner for heating said coil, means for supplying a fluid combustible to said burner, and a common means for varying the supply of fluid to said burner and for varying the outlet connection according as the coil is used as a water heater or a steam generator.

6. The combination with a tank, a coil and a heater for said coil, of connections between said coil and tank for establishing a water circulation, alternative connections between said coil and the water supply and discharge conduits, means for supplying a heating medium to the heater, and means for regulating the supply of said heating medium to the burner and the water to said coil according as the latter is operating as a water heater or a steam generator.

7. The combination with a tank, a coil and a heater for said coil, of means for alternatively connecting said coil with said tank to form a circulating heater therefor and to operate said coil independently of said tank as a steam generator, means for supplying a heating medium to said heater, and means for restricting the supply of said medium to the heater and the water to said coil when the latter is operating as a steam generator.

8. The combination with a coil alternatively used to heat water and generate steam, of pipes for respectively drawing off steam and water from said coil, means for supplying water to the coil, a heater for the coil, means for supplying a heating medium to the heater, and a common means for varying the supply of said medium to the heater and for varying the outlet connection of the coil according as the latter is used to heat water or generate steam.

9. The combination with a tank and supply and discharge connections therefor, of a water vessel, means for unrestrictedly connecting said vessel to said tank to form a circulating heater therefor, and alternative means for forming a restricted supply and a discharge connection with said vessel to operate the same as a steam generator.

10. The combination with a tank, a water vessel and a heater for said vessel, means for alternatively connecting said vessel with said tank to form a circulating heater therefor and for operating said vessel independently of said tank as a steam generator, and means for regulating the heat and quantity of water admitted to said vessel according as the latter is operating as a water heater or a steam generator.

11. The combination with a tank, a water vessel and a fluid burner for heating said vessel, of connections between said vessel and tank for establishing a water circulation, alternative connections between said vessel and the water supply and discharge conduits, and means for regulating the fluid to the burner and the water to said vessel according as the latter is operating as a water heater or a steam generator.

12. The combination with a tank, a water vessel and a fluid burner for heating said vessel, of means for alternatively connecting said vessel with said tank to form a circulating heater therefor and to operate said vessel independently of said tank as a steam generator, and means for restricting the supply of fluid combustible to said burner and water to said vessel when the latter is operating as a steam generator.

13. The combination with a tank, a water vessel and a fluid burner for heating said vessel, of means for alternatively connecting said vessel with said tank to form a circulating heater therefor and to operate said vessel independently of said tank as a steam generator, and means for varying the amount of water admitted to said vessel when operating as a steam generator.

14. The combination with a water vessel alternatively used to heat water and generate steam, of pipes for respectively drawing off steam and water from said vessel, means for supplying water to said vessel, and a common means for varying the supply of water to the vessel and for varying its outlet connection according as the vessel is used as a water heater or a steam generator.

15. The combination with a water vessel alternatively used to heat water and generate steam, of pipes for respectively drawing off steam and water from said vessel, means for supplying water to the vessel, a burner for heating said vessel, means for supplying a fluid combustible to said burner, and a common means for regulating the supply of fuel to said burner and for varying the outlet connection according as the vessel is used as a water heater or a steam generator.

16. The combination with a tank, a water vessel and a heater for said vessel, of connections between said vessel and tank for establishing a water circulation, alternative connections between said vessel and the water supply and discharge conduits, means for supplying a heating medium to the heater, and means for regulating the supply of said heating medium to the heater and the water to said vessel according as the latter is operating as a water heater or a steam generator.

17. The combination with a tank, a water vessel and a heater for said vessel, of means for alternatively connecting said vessel with said tank to form a circulating heater therefor and to operate said vessel independently of said tank as a steam generator, means for supplying a heating medium to said heater, and means for restricting the supply of said medium to the heater and the water to said vessel when the latter is operating as a steam generator.

18. The combination with a tank, a water vessel and a heater for said vessel, of means for alternatively connecting said vessel with said tank to form a circulating heater therefor and to operate said vessel independently of said tank as a steam generator, means for decreasing the amount of water admitted to said vessel when operating as a steam generator, and means for supplying a heating medium to said heater.

19. The combination with a water vessel alternatively used to heat water and generate steam, of pipes for respectively drawing off steam and water from said vessel, means for supplying water to the vessel, a heater for the vessel, means for supplying a heating medium to the heater, and a common means for varying the supply of said medium to the heater and for varying the outlet connection of the water vessel according as the latter is used to heat water or generate steam.

20. The combination with a tank, of a heating vessel, alternative means for connecting said vessel with said tank to form a water circulation system and to operate said vessel as a steam generator, and means for changing the relative proportion of heat and water supplied to said vessel according as said vessel is used as a water heater or steam generator.

21. The combination with a tank, of a heating vessel, alternative means for connecting said vessel with said tank to form a water heating circulation system and for operating said vessel as a steam generator, a heater for said vessel, and means for changing the relative proportion of fuel passing to said heater and water passing to said vessel, according as said vessel is operating as a water heater or steam generator.

22. The combination with a tank, a heating vessel and a heater for said vessel, of supply and discharge conduits, connections between said vessel and tank for forming a water circulation system, alternative connections between said vessel and said water supply and discharge conduits for operating said vessel as a steam generator and means for changing the relative proportion of fuel passing to said heater and water passing to said vessel according as said vessel is operating as a water heater or a steam generator.

In testimony whereof, I affix my signature.

AUGUST H. KOHLMEYER.